Figure 1:
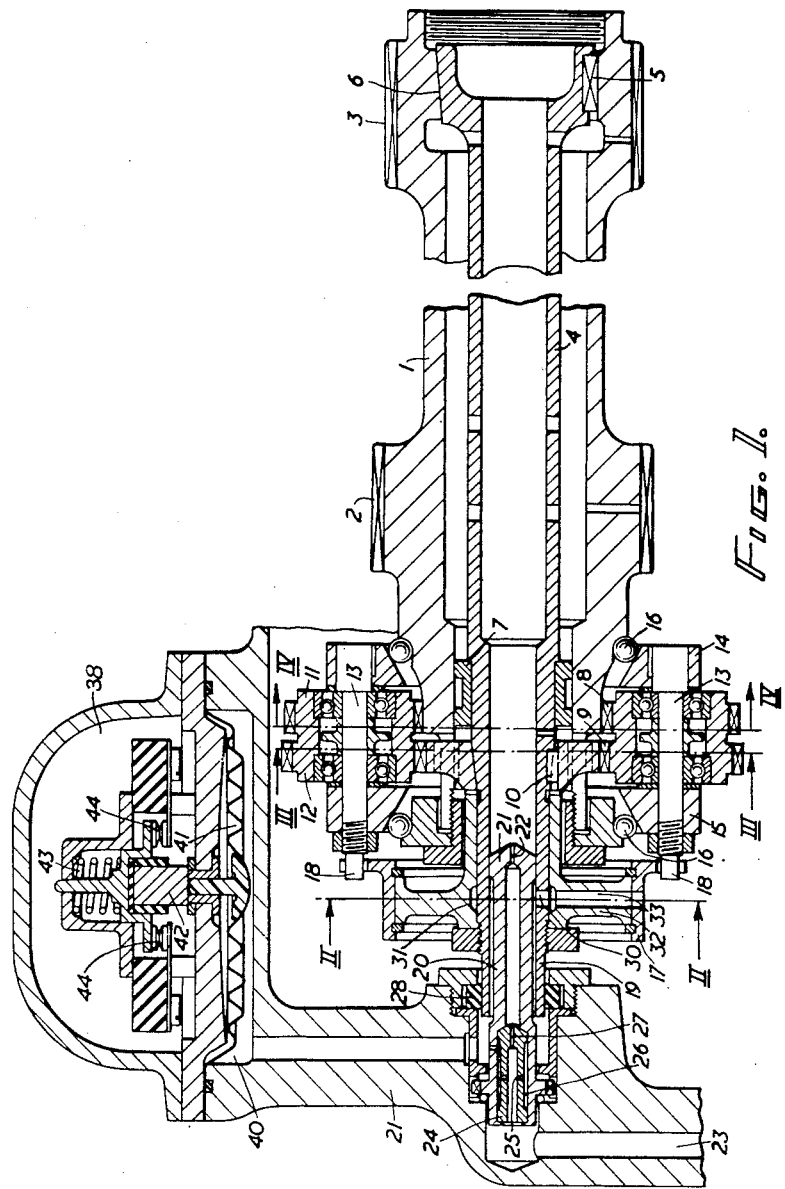

May 7, 1957 R. A. GILBERT 2,791,655
TORQUE RESPONSIVE DEVICES
Filed April 11, 1955 2 Sheets-Sheet 2

INVENTOR
RONALD A. GILBERT

United States Patent Office 2,791,655
Patented May 7, 1957

2,791,655

TORQUE RESPONSIVE DEVICES

Ronald Albert Gilbert, North Wembley, England, assignor to D. Napier & Son Limited, London, England, a company of Great Britain Application April 11, 1955, Serial No. 500,612

Claims priority, application Great Britain April 26, 1954

6 Claims. (Cl. 200—61.46)

This invention relates to devices which are responsive to the value or direction of transmitted torque, and is particularly applicable to arrangements where the value of the transmitted torque is relatively great. In such cases any torsionally flexible element through which torque is to be transmitted must of necessity be relatively stiff, and the torsional deflection correspondingly small. It is an object of the invention to provide an improved device of this kind which will provide a positive indication of changes in the torque transmitted.

A torque responsive device according to the present invention comprises a torsionally flexible member through which torque is to be transmitted, the torsional deflection of which varies with the torque transmitted, and means responsive to the torsional deflection of the element including multiplying mechanism comprising a first pair of coaxial sun pinions connected for rotation respectively with the spaced parts of the flexible element between which the torsional deflection occurs, one of these sun pinions having a slightly greater pitch diameter than the other and a pair of planet pinions fixed for rotation together and meshing respectively with the sun pinions and mounted coaxially on a rotary spider which is capable of rotary movement about the common axis of the sun pinions, and indicating or signalling means responsive to changes in the rotary position of the rotary spider relative to one of the sun pinions.

It will be understood that by providing a very small difference between the pitch diameters of the first pair of pinions, the mechanical advantage of the multiplying mechanism may be of substantial value.

In a preferred construction the two sun pinions are mounted adjacent one another on two concentric shafts, which are connected for rotation together at a point spaced axially from the sun pinions, one of the concentric shafts constituting the torsionally flexible member.

Preferably the torsionally flexible element comprises a hollow shaft, and one of the sun pinions is rigidly fixed for rotation with one end of the shaft, while the other sun pinion is connected to the opposite end of the shaft by a second shaft lying within the hollow shaft.

According to another preferred feature of the invention, movements of the rotary spider are arranged to operate switch mechanism which thus comes into operation when a predetermined torque is being transmitted. Moreover the switch is preferably hydraulically operated, and the rotary spider is formed with a port which cooperates with a port carried by a part rotating with one of the first pair of pinions to constitute a valve in the hydraulic circuit associated with the switch mechanism, to control such switch mechanism.

The invention is particularly applicable to aircraft power units including a prime mover and a variable pitch propeller. In certain conditions, particularly at takeoff, a substantial drop in engine output or reversal of torque due to a complete failure of the prime mover is liable to lead to a dangerous increase in drag due to "wind-milling" of the propeller. Particularly in multi-engined aircraft it is inconvenient or impossible for the pilot during take-off to control individually each separate power unit.

When applied to a power unit for aircraft propulsion purposes therefore a torque responsive device according to the invention may be arranged to move the propeller into a "feathered" position immediately the torque transmitted between the prime mover and propeller is below a certain value or is reversed.

The invention may be performed in various different ways but one specific embodiment will now be described by way of example as applied to the transmission gearing between a reciprocating internal combustion engine and a variable pitch propeller of an aircraft power plant.

Figure 2:
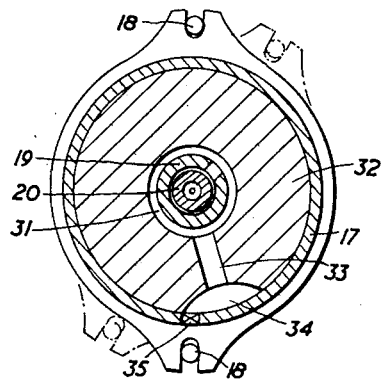
Figure 3:
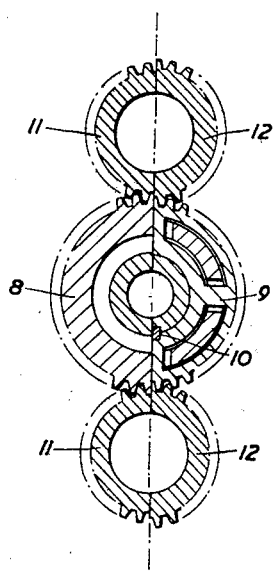

In the accompanying drawings Figure 1 is a sectional side elevation through the torque responsive apparatus, Figure 2 is a sectional end elevation on the line II—II of Figure 1, and Figure 3 is a composite sectional end elevation, the right hand side being taken on the line III—III, and the left hand side on the line IV—IV of Figure 1.

In this example the transmission gearing includes at least one relatively lengthy hollow quill shaft 1 which is formed as a torsionally flexible element (though it must be sufficiently stiff to transmit substantial torque) and is provided with pinions 2, 3, at opposite ends (hereinafter referred to for convenience as the "input" and "output" ends) these pinions being connected to the engine and to the propeller respectively. At least part of the torque transmitted between the engine and propeller is therefore transmitted also through the quill shaft which distorts helically under this transmitted torque.

An idler shaft 4 is mounted freely within the hollow quill shaft 1, being rigidly secured to the quill shaft by means of a key 5 and conical seating 6 at the "output" end thereof, and projecting somewhat beyond the "input" end within which it is supported by a bearing bush 7. Torsional deflection of the quill shaft 1 thus appears as relative rotation between the "input" end of the quill shaft, and the adjacent end of the idler shaft 4 though it will be understood that in operation both shafts may be rotating as a unit at high speed. Multiplying mechanism is arranged to increase this relative movement and the final magnified movement is used to operate electrical switch mechanism indicated generally at 38 which actuates the variable pitch control mechanism (not shown) of the propeller to set the propeller in the "fully feathered" condition when the direction of torque transmission between the engine and propeller falls below a given value or is reversed. The pitch control mechanism may be of any well known kind and will not therefore be described in detail.

The multiplying mechanism includes a pair of coaxial sun pinions 8 and 9 arranged closely side-by-side, the pinion 8 being secured to the input end of the quill shaft 1 while the other sun pinion 9 is secured to the adjacent end of the idler shaft 4 by means of a key 10. The sun pinion 8 on the quill shaft is provided in the present example with 36 teeth while the pinion 9 on the idler shaft is provided with 35 teeth, their pitch diameters being in the same proportion. Two epicyclic planet assemblies, each including a pair of coaxial planet pinions 11 and 12 having 24 and 25 teeth respectively, are arranged to engage the first pair of sun pinions 8 and 9. The pinions 11, 12, of each planet assembly are rigid with one another for rotation as a unit on their common axis. The planet assemblies are on bearings on shafts 13, carried by a rotary spider comprising a pair of rotary rings 14, 15. The rings 14, 15 are supported on bearings 16 coaxially with the hollow quill shaft, and the spider is connected for rotation with a rotary valve sleeve 17 by means of pins 18 on the ends of the shafts 13.

It will be seen that a small rotary movement (equal, say, to one tooth) of the sun pinion 8, relative to the sun pinion 9, will tend to cause the planet pinion 11 to rotate through an angle corresponding to one of its teeth. Assuming the spider 14, 15 to be stationary, the second planet pinion 12, rigidly attached to the pinion 11, will tend to rotate through the same angle, which in this case corresponds to rather more than one tooth. Since the pinion 12 is in mesh with the pinion 9, however, it cannot rotate in this way. The net result, therefore, is that the spider rotates, carrying the planet pinions with it, until the relative tooth displacement between the planet pinions corresponds to the relative displacement between the sun pinions. The overall gear ratio is $(1-\frac{35}{25}\times\frac{24}{36})$; that is, for one revolution of sun pinion 8 relative to sun pinion 9, the spider will rotate through 15 revolutions.

The sleeve 17 is free to rotate on a tubular extension 19 of the idler shaft 4. A fixed hollow spigot 20, mounted on a part of the casing wall 21 surrounding the apparatus, extends into the open end of the tubular extension 19 on the idler shaft, and is formed with an enlarged head 21 at its inner end which engages the inner surface of the bore in the tubular extension, and is formed with a restricted metering orifice 22 through which hydraulic fluid passes into the shaft 4 for lubrication purposes.

Hydraulic fluid under pressure is delivered through a conduit 23 in the casing wall into a two-way metering plug 24 fitted tightly into the rear end of the spigot 20. The plug 24 is formed with a series of radial metering orifices 25 leading to an annular chamber 28, and is also formed with a single restricted orifice 27 leading into the interior of the spigot 20 and thence to the orifice 22. A seal is formed between the rotating extension tube 19 and the adjacent part of the casing by a sealing ring 28, and the chamber 26 communicates with the annular space between the spigot 20 and the extension tube 19, which is closed at its remote end by the head 21 on the spigot. The tubular extension 19 is provided with a radial passage 30 which communicates with an annular gallery 31 enclosed by a valve disc 32 which is connected for rotation with the idler shaft 4. The disc 32 is also formed with a radial passage 33 terminating in a recess 34 which cooperates with a radial port 35 in the valve sleeve 17 to act as a hydraulic fluid control valve, as the spider moves relative to the idler shaft. The relative movement of the spider, which results from torsional deflection of the quill shaft 1 is a measure of the torque transmitted through the shaft, and the arrangement of the parts is such that this opening of the control valve port 35 occurs when the direction of transmitted torque through the quill shaft is reversed, though it will be understood that the valve may be arranged to open at any predetermined value of transmitted torque.

The chamber 26 communicates also with a pressure chamber 40 containing a flexible diaphragm 41. The mid point of the diaphragm is arranged to act on an insulated press button 42 which acts against a spring 43 to open a pair of electrical switch contacts 44, which are associated with the circuit of a solenoid operated valve arranged to actuate the control mechanism of the variable pitch propeller to set the propeller into the "fully feathered" position. When the direction of torque transmitted through the transmission gearing is in the normal direction from the engine to the propeller, escape of fluid through the relief port 35 in the valve sleeve is prevented, and hydraulic pressure is exerted on the diaphragm 41 to maintain the switch open, in which case the variable pitch control mechanism operates normally. When the relief port 35 opens however due to a reversal of torque the escape of fluid through the ports acts to reduce the pressure acting on the diaphragm, and the switch closes, so immediately causing the propeller to move into the "fully feathered" position.

In the event of an engine failure or substantial loss of power, the propeller is thus automatically feathered, and the air drag which would otherwise result, is lessened.

What I claim as my invention and desire to secure by Letters Patent is:

1. A torque responsive device comprising a torsionally flexible member through which torque is to be transmitted, the torsional deflection of which varies with the torque transmitted, and means responsive to the torsional deflection of the element including multiplying mechanism comprising a first pair of coaxial sun pinions connected for rotation respectively with the spaced parts of the flexible element between which the torsional deflection occurs, one of these sun pinions having a slightly greater pitch diameter than the other, a rotary spider coaxial with the sun pinions and a pair of planet pinions fixed for rotation together and meshing respectively with the sun pinions and mounted coaxially on the rotary spider, and devices operable in response to changes in the rotary position of the rotary spider relative to one of the sun pinions.

2. A torque responsive device as claimed in claim 1, including two concentric shafts, the two sun pinions being mounted adjacent one another on the adjacent ends of the two concentric shafts, which are connected for rotation together at a point spaced axially from the sun pinions, one of the concentric shafts constituting the torsionally flexible member.

3. A torque responsive device as claimed in claim 1 in which the torsionally flexible element comprises a hollow shaft, and one of the sun pinions is rigidly fixed for rotation with one end of the shaft, while the other sun pinion is connected to the opposite end of the shaft by a second shaft lying within the hollow shaft.

4. A torque responsive device as claimed in claim 3 in which said devices include switch mechanism which thus comes into operation when a predetermined torque is being transmitted.

5. A torque responsive device as claimed in claim 4 in which the switch mechanism is hydraulically operated, and the rotary spider is formed with a part which co-operates with a part rotating with one of the sun pinions to constitute a valve in the hydraulic circuit associated with the switch mechanism, to control such switch mechanism.

6. A torque responsive device comprising a torsionally flexible member through which torque is to be transmitted, the torsional deflection of which varies with the torque transmitted, and means responsive to the torsional deflection of the element including multiplying mechanism comprising a first pair of coaxial sun pinions connected for rotation respectively with the spaced parts of the flexible element between which the torsional deflection occurs, one of these sun pinions having a slightly greater pitch diameter than the other, a rotary spider coaxial with the sun pinions and a pair of planet pinions fixed for rotation together and meshing respectively with the sun pinions and mounted coaxially on the rotary spider, and devices operable in response to changes in the rotary position of the rotary spider relative to one of the sun pinions, said devices including switch mechanism rendered effective when a predetermined torque is being transmitted.

References Cited in the file of this patent
UNITED STATES PATENTS
2,159,778    Bush _____ May 23, 1939